United States Patent [19]
Perlman et al.

[11] Patent Number: 5,511,168
[45] Date of Patent: Apr. 23, 1996

[54] VIRTUAL CIRCUIT MANAGER FOR MULTICAST MESSAGING

[75] Inventors: Radia J. Perlman, Acton; William R. Hawe, Pepperell, both of Mass.

[73] Assignee: Digital Equipment Corporation, Maynard, Mass.

[21] Appl. No.: 86,593

[22] Filed: Jul. 1, 1993

[51] Int. Cl.$^6$ .......................... H04L 12/46; H04L 12/56; H04Q 7/22; G06F 13/00
[52] U.S. Cl. ..................... 395/200.15; 395/200.02; 395/311; 370/54; 370/60.1; 370/94.1; 364/940; 364/940.61; 364/940.64; 364/919; 364/927.92; 364/DIG. 2
[58] Field of Search ............................ 395/200, 325, 395/200.15, 311, 200.02; 340/825.52; 370/60, 54, 94.1, 60.1, 62

[56] References Cited

U.S. PATENT DOCUMENTS

| | | | |
|---|---|---|---|
| 4,456,957 | 6/1984 | Schieltz | 395/200 |
| 5,079,767 | 1/1992 | Perlman | 370/94.3 |
| 5,095,480 | 3/1992 | Fenner | 370/94.1 |
| 5,103,444 | 4/1992 | Leung et al. | 370/60 |
| 5,138,614 | 8/1992 | Baumgartner et al. | 370/62 |
| 5,179,556 | 1/1993 | Turner | 370/94.1 |
| 5,191,650 | 3/1993 | Kramer et al. | 395/200 |
| 5,214,646 | 5/1993 | Yacoby | 370/85.14 |
| 5,305,311 | 4/1994 | Lyles | 370/60 |
| 5,309,430 | 5/1994 | Verhille et al. | 370/60 |
| 5,309,433 | 5/1994 | Cidon et al. | 370/60 |
| 5,327,420 | 7/1994 | Lyles | 370/60 |
| 5,402,415 | 3/1995 | Turner | 370/60 |
| 5,412,654 | 5/1995 | Perkins | 370/94.1 |
| 5,428,615 | 6/1995 | Backes et al. | 370/85.13 |
| 5,444,702 | 8/1995 | Burnett et al. | 370/60.1 |

OTHER PUBLICATIONS

Tanenbaum, Computer Networks, Printice Hall, Inc., Englewood Cliffs, New Jersey (1988), pp. 306–308.
Perlman, Interconnections: Bridges and Routers, Addison-Wesley Publishing Company, Inc., Reading Massachusetts (1992), pp. 253–255.
Ballardie et al., Core Base Trees (CBT): An Architecture for Scalable Inter-Domain Multicast Routing, Internet-Draft of the Internet Engineering Task Force (1993) pp. 1–20.

*Primary Examiner*—Gopal C. Ray
*Attorney, Agent, or Firm*—Christine M. Kuta; A. Sidney Johnston

[57] ABSTRACT

A multicast connection arrangement is provided by which a source node may establish multicast virtual circuits to a group of destination nodes of an arbitrary-topology network using a single procedure, and may subsequently modify those circuits, i.e., add or delete destination nodes, with a single, related procedure. The arrangement includes a multicast setup packet for opening the multicast virtual circuits, the packet containing a multicast identifier field, a virtual circuit field and a destination field identifying a list of desired destination node addresses. The multicast setup packet may be also used to add destination nodes to the circuits while a multicast delete packet is used to delete nodes from the circuits. When adding nodes to the multicast virtual circuits, a topology analysis process is provided to prevent the formation of an unstable network topology.

8 Claims, 4 Drawing Sheets

VIRTUAL CIRCUIT MANAGER FOR MULTICAST MESSAGING

FIELD OF THE INVENTION

This invention relates generally to network systems and, more specifically, to multicast virtual circuits in arbitrary-topology networks.

BACKGROUND OF THE INVENTION

A computer network typically comprises a collection of interconnected nodes such as computer systems and switches, which may, in turn, be connected through an irregular configuration of transmission lines, i.e., links. The switches are specialized computers used to connect two or more links. Data is exchanged among nodes of such an "arbitrary-topology" network by passing packets from switch to switch over the links. Specifically, when a packet arrives on an incoming link, the switch decides onto which of the outgoing links that packet will be forwarded.

In a connection-oriented network a virtual circuit is commonly established when exchanging packets between nodes of the network. The virtual circuit is a temporary logical path connection that requires a set up procedure to "open" the virtual circuit prior to transferring the data packets and a release procedure to "close" the circuit once the data transfer is complete. This obviates the need for effecting routing decisions for each data packet that is transferred between the nodes once the circuit is opened.

For point-to-point communication, the set up procedure creates a virtual circuit by allocating certain switches and links in the network to establish the "best" route, according to conventional route configuration techniques, between a source node and a destination node. To illustrate, refer to FIG. 1A. Here, node A of network 10 performs a set up procedure to open a virtual circuit route that encompasses the switches $S_{A-D}$. This route is identified by a virtual circuit (VC) number, VC2, that is associated with node A's local switch $S_A$. In order to ensure that data packets subsequently transferred from node A always follow this virtual circuit route to node D, each switch along VC2 maintains a forwarding table with entries indicating where to forward the data packets in accordance with tile routing configuration results.

FIG. 1B illustrates tile forwarding tables 20a–d contained within the switches $S_{A-D}$ of the network 10. Each entry of the tables includes an incoming portion and an outgoing portion, with each portion including a port name and a VC number associated with that port. Each data packet transferred over the network contains a VC field identifying the open VC number on which it has arrived. Thus, when a packet is received at an incoming port of switch $S_c$, that switch searches the left (incoming) portion 22i of its table 20c, using the incoming port, e.g., Z, and VC number found in the packet, e.g., VC7, as the key. When a match is found, the outgoing portion 22o of tile entry identifies the VC number, e.g., VC4, to insert into the VC field of the packet and the port, e.g., Q, to which it should pass the packet. It is therefore apparent that the VC numbers and forwarding tables provide enough information to guide tile data packets through the allocated switches and links to the destination.

Multicasting involves transmitting a single multicast packet from a source node and having it received by a group of destination nodes. A problem associated with this type of point-to-multipoint communication technique concerns forming an efficient "delivery tree", i.e., a collection of nodes and links, that the multicast packet must traverse to reach the destination nodes. One approach, known as Core Based Trees (CBT), addresses this problem by establishing a core, point-to-point virtual circuit "tree" and then executing a set up procedure for each additional destination node of the group. However, the CBT approach is "static", in the sense that if a more efficient path exists, the delivery tree cannot easily be adapted to the "better" topology.

Another problem involves adding and deleting nodes from tile multicast group of destinations. In CBT networks, each destination node initiates a procedure to add or delete itself; accordingly, the source node is unaware of the tree configuration and its constituent destination nodes.

An alternative to tile CBT technique involves creating subsequent "branch" links for the additional destination nodes without destroying the existing tree connections. Such an approach is illustrated in FIG. 2. Here, a tree is formed that consists of virtual circuits from source node N to a multicast group of destination nodes D1 and D2; specifically the virtual circuit to node D1 encompasses switches $S_A$ and $S_F$, and the virtual circuit to node D2 encompasses switches $S_{A-D}$.

A branch link represented by VC8 is subsequently formed with the tree to add node D3 to tile group of destination nodes. However, the addition of VC8, in turn, forms a "loop" among the switches $S_A$, $S_B$, $S_C$ and $S_F$ and the intervening links, thereby creating an unstable topology. Specifically, if tile tree connections are bidirectional, i.e, packets may flow through the ports of switches $S_A$ and $S_C$ in both directions as indicated by the double-headed arrows 22, a packet that is propagating within the loop may revolve endlessly around that loop, thereby adversely affecting the bandwidth of the network. If the connections are unidirectional as indicated by the single-headed arrows 21 flowing into switch $S_E$, duplicate copies of the packets may be delivered to the destination node D3 which again, negatively affect bandwidth.

Another known point-to-multipoint communication technique requires each destination node to "register" with its local switch to receive packets addressed to a particular multicast address. Specifically, the destination node sends a request to its local switch which then forwards the request to all the switches in the network. Each switch in the network updates its forwarding table to store routing information, i.e., state, pertaining to all of the destination nodes for each multicast address. A disadvantage of this technique is that a significant amount of processing and storage overhead is needed for each switch to maintain state for each destination node.

Point-to-multipoint communication in a connectionless network involves transmitting a single multicast packet that is received by multiple destinations. For this type of network, however, each multicast packet contains a list of destination nodes. When the packet arrives at an incoming link of a first switch, that switch checks the list to select a set of outgoing links that will provide the best route to at least one of the destinations. The switch generates a new copy of the multicast packet for each selected outgoing link and includes, in each packet, those destinations that use the link. Ultimately, each multicast packet will identify only one destination and is treated as a normal data packet.

Therefore, it is among the objects of the invention to provide a method and apparatus for creating multicast virtual circuits in an arbitrary-topology network without disrupting the operation of the network.

Another object of the invention is to provide a method and apparatus for adding nodes to established multicast virtual circuits without affecting the performance of the network.

Another object of the invention is to provide a method and apparatus for easily modifying established multicast virtual circuits to reflect a more efficient topology.

Yet another object of the invention is to provide a mechanism for establishing multicast virtual circuits that incorporates features of a connection-oriented and a connectionless network.

SUMMARY OF THE INVENTION

The present invention resides in a novel multicast connection arrangement by which a source node may establish virtual circuits to a group of destination nodes by executing a single procedure, and may subsequently modify those circuits, i.e., add or delete destination nodes, with a related procedure. The switches and links allocated to the multiple-destination virtual circuits of an arbitray-topology network are elements of multicast virtual circuits. In accordance with the arrangement, only switches of the multicast virtual circuits need maintain routing information relating to the destination nodes. Thus, the invention enables the source node to maintain control of the virtual circuit configurations, while optimizing the bandwidth, throughput and efficiency of the arbitrary-topology network.

In one aspect of the invention, a multicast setup packet is used to open multicast virtual circuits. The multicast setup packet contains a multicast identifier field, a virtual circuit field and a destination field identifying a list of desired destination node addresses. Prior to issuing the multicast setup packet, a source node enters appropriate information into each of the fields, with the VC field containing a virtual circuit value associated with the port connecting the source to its local switch.

Upon receiving tile packet at its incoming port, tile local switch checks the list of destination nodes and selects a set of outgoing links that provide the best route to at least one of the destination nodes. Selection is based upon the results of route configuration, e.g., availability and loading, analysis. This group of incoming and outgoing ports is called a multicast port group.

The switch then generates entries of an internal forwarding table for the newly-formed multicast group. The entries contain routing information. i.e., state, such as (i) a unique multicast identifier (MI) value that is acquired from the identifier field, (ii) the name of the incoming port and its associated VC value acquired from the VC field and (iii) the names of the selected outgoing ports and their associated VC values. In addition, the switch marks the incoming VC value entry as originating from the source node.

Prior to forwarding each packet onto its respective outgoing link, the switch generates a copy of the multicast setup packet for each of the selected outgoing ports. The switch then updates both the VC field to contain a VC value associated with each selected outgoing port and the destination field to contain only those destination nodes receiving the copy of the packet. Finally, the packets are transferred over the network.

After traversing a number of successive switches, each multicast setup packet identifies only one destination, thereby effectively "opening" a virtual circuit. Data packets subsequently issued by the source need only include the initial local VC value in order propagate along the multicast virtual circuits and arrive at the respective destination nodes.

The multicast setup packet is also used to add destination nodes to the multicast virtual circuits. The fields of the packet contain the same information used when opening the virtual circuits, except that the destination field now contains only the new destination node addresses. Upon receiving the "additional" multicast setup packet, each switch of the multicast virtual circuits again performs a configuration analysis to determine the best routes.

In accordance with the invention, each switch also executes a topology analysis process to detect whether the added nodes will create loops in the network or will result in the creation of duplicate packets. The first step of the process involves each switch checking the entries of its forwarding table to determine if the incoming port, through which the multicast setup packet is entering the switch, is allocated to an open multicast virtual circuit having an MI value that matches the MI value of the packet. If not, the next step involves an inquiry of whether there are any existing entries in the table associated with that particular MI value. If the answer to the latter question is yes, two options are available: (i) the switch maintains a separate virtual circuit for each of the existing and added destinations, or (ii) the switch deletes the port marked as being from the source and establishes a "new" virtual circuit connection using the added incoming port. The switch then updates the entries of the forwarding table to reflect the changed topology.

In another aspect of the invention, a multicast delete packet is used to delete an existing node (and link) from the list of destinations associated with the multicast virtual circuits. Here, the multicast delete packet is issued by the destination node seeking removal from the virtual circuit. Specifically, the packet need only contain the unique multicast identifier value and the VC value of the port to be deleted.

An advantage of the invention is that a source node can initiate virtual circuit connections to destination nodes with a single setup procedure thereby allowing the source to efficiently control the configuration of nodes and implement management, i.e., auditing, functions.

Another advantage of the invention is that changes to multicast virtual circuits can be performed quickly and efficiently without degrading the network because of loop creation and duplicate packet generation.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 3:
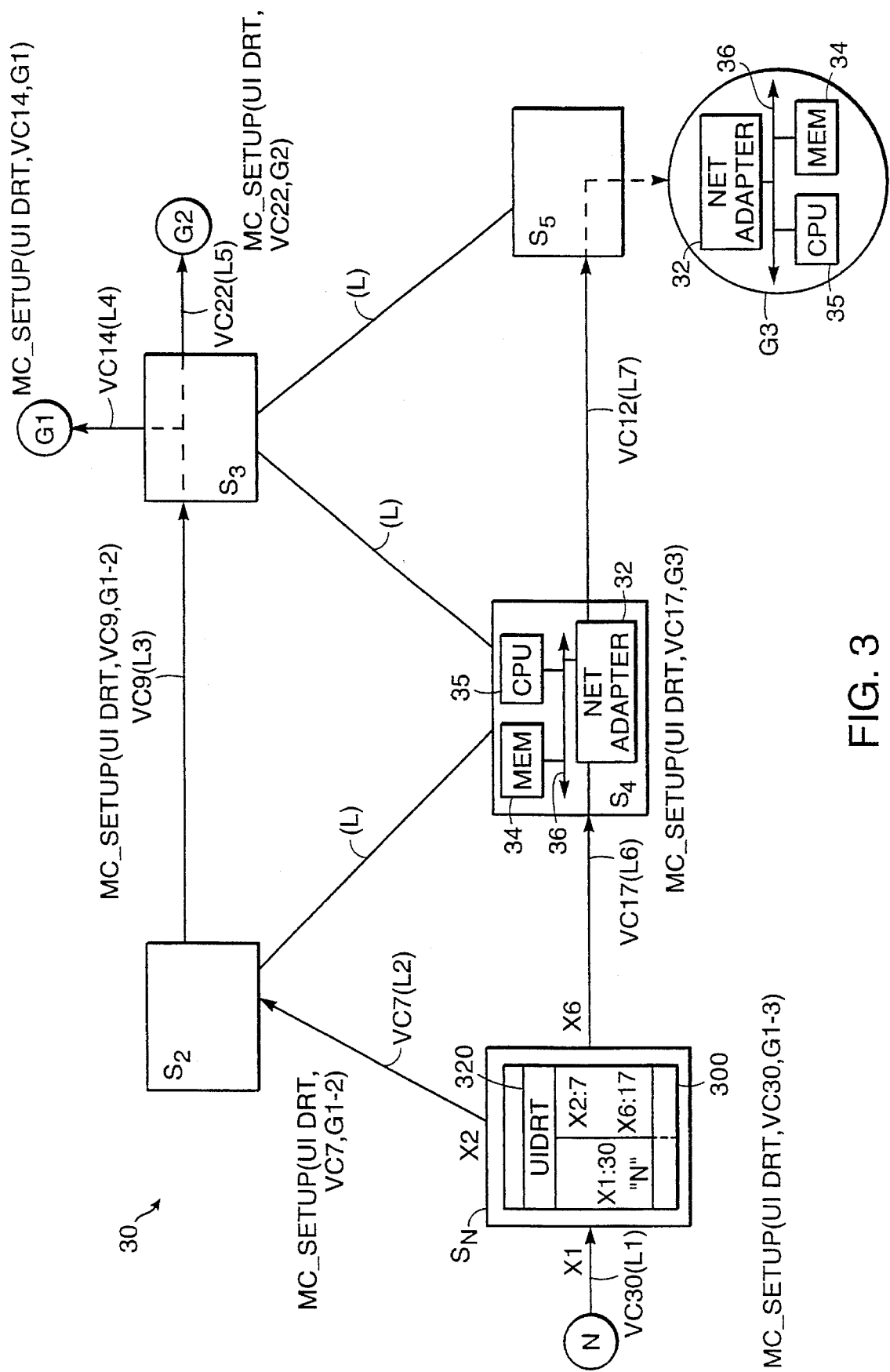
FIG. 3 is a diagram of a connection-oriented, arbitrary-topology network in which the multicast connection arrangement of this invention may be advantageously used.

FIG. 3 depicts a connection-oriented, arbitrary-topology network 30 of interconnected nodes in which the multicast connection arrangement of this invention may be advantageously used. The nodes are typically general-purpose computers comprising a source node N and a group of destination nodes G1–3. Each node is coupled to a respective "local" switch S, i.e., a specialized computer. Each switch S is configured to facilitate the flow of information in the network 30 by providing, along with its incoming and outgoing links L, connections between the source and destination nodes.

Each node and switch typically comprises a central processing unit (CPU) 35, a memory unit 34 and at least one network adapter 32 interconnected by a system bus 36. The main memory 34 may comprise storage locations typically composed of random access memory (RAM) devices, which are addressable by the CPU and network adapter. An operating system, portions of which are typically resident in main memory 34 and executed by CPU 35, functionally organizes the nodes and switches. The operating system invokes network operations in support of programs executing in the CPU 25.

As previously noted, in conventional, connection-oriented networks, a point-to-point virtual circuit is established between a source node and a destination node prior to "adding" nodes to the circuit. In accordance with the invention, a multicast connection procedure provides a means for efficiently "opening" multicast virtual circuit routes using a single procedure. Specifically, the procedure allocates appropriate switches and their connecting links to establish the best routes between the source node and destination nodes prior to transferring information from the source to those destinations. Selection is effected by conventional adaptive-type routing algorithms used in route configuration analysis. The information is encapsulated as a packet and the packet is forwarded from the source node's local switch to each of the destination nodes' local switches via one or more intermediate switches.

In general, when the packet is received at an incoming port of an intermediate switch, it is stored there until the routing determination is made as to which of the outgoing ports the packet will be forwarded. This group of ports is called a multicast port group. A feature of the invention is that only those switches of tile multicast virtual circuits need maintain routing information relating to tile destination nodes. Thus, the invention enables tile source node to maintain control of tile virtual circuit configurations, while optimizing tile bandwidth, throughput and efficiency of tile arbitray-topology network.

Figure 4:
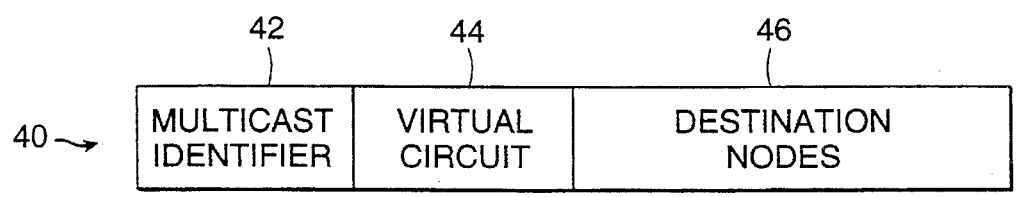
FIG. 4 illustrates the format of a multicast setup packet used to open multicast virtual circuits in accordance with the invention.

In order to open tile multicast virtual circuits, the source node N creates a multicast setup packet, MC_SETUP, tile format of which is shown in FIG. 4. The MC_SETUP packet 40 contains a multicast identifier (MI) field 42, a virtual circuit (VC) field 44 and a destination nodes field 46, the latter field identifying a list of desired destination node addresses, e.g., G1–3. An example of the contents of the MI field may be a user identification number. e.g., UID, concatenated to an instantaneous value of a real-time clock, e.g., RT, to provide a unique multicast identifier, e.g., UIDRT. The source node N enters the appropriate information into each of the fields, with the VC field 44 containing a virtual circuit value. e.g., VC30, associated with the port X1 connecting the source N to its local switch $S_N$. Accordingly, for the example illustrated herein, the resulting completed multicast setup packet generated by source N may be represented as MC_SETUP (UIDRT, VC30, G1–3).

Refer again to FIG. 3. The source N forwards tile packet 40 to its local switch $S_N$, which checks the list of nodes G1–3 in the D field 46 and selects a set of outgoing ports, each of which provides the best route to at least one of these destination nodes. Here, the ports X2 and X6 are selected, with X2 providing the best virtual circuit route, VC7, to nodes G1 and G2, and X6 providing the best route VC17 to G3. Because there are two distinct routes to the destination nodes, the MC_SETUP packet is "spawned" at the switch $S_N$ and a copy of the packet is generated for each port X2 and X6 of the multicast group.

The switch $S_N$ also generates entries in its internal forwarding table 300 for the MC_SETUP packet 40, with each entry 320 containing routing state such as the UIDRT value acquired from the MI field 42, the incoming port X1 and its associated VC30 value acquired from the VC field 44 and outgoing VC7 and VC17 values selected for the outgoing ports X2 and X6, respectively. In addition, the switch marks the incoming VC30 value with the letter "N", indicating that this entry originated from the source node.

Prior to forwarding each packet to its respective port, the switch $S_N$ updates the VC field 44 of each packet 40 to contain the VC value associated with each selected outgoing port and modifies the destination field 46 to contain only those destinations using that particular port. Accordingly, MC_SETUP (UIDRT, VC7, G1–2) is forwarded through port X2 and onto link L2, while MC_SETUP (UIDRT, VC17, G3) is forwarded through port X6 and onto link L6.

The procedure described above is repeated at each intermediate switch along the multicast virtual circuits until each MC_SETUP packet 40 identifies only one destination. Thus, as an example, MC_SETUP (UIDRT, VC9, G1,2) is forwarded onto link L3 by switch $S_2$ and is thereafter spawned into two multicast setup packets at switch $S_3$. One of the resulting packets, MC_SETUP (UIDRT, VC14, G1) is passed to node G1, while the other packet, MC_SETUP (UIDRT, VC22, G2) is passed to node G2.

At this point, the multicast virtual circuits are effectively "opened". Since each switch along the multicast virtual circuits maintains routing state relating to the best routes to the destination nodes, data packets subsequently issued by tile source node N need only contain the initial local VC value in order propagate along each virtual circuit and arrive at the respective destination nodes. Furthermore, if a packet issued by destination node GI or G2 arrives at port X2 of switch $S_N$ having a VC value VC7, the switch $S_N$ forwards the packet out the remaining ports of the multicast group, e.g., out port X1 with a VC value VC30 and out port X6 with a VC value VC17.

Figure 5:
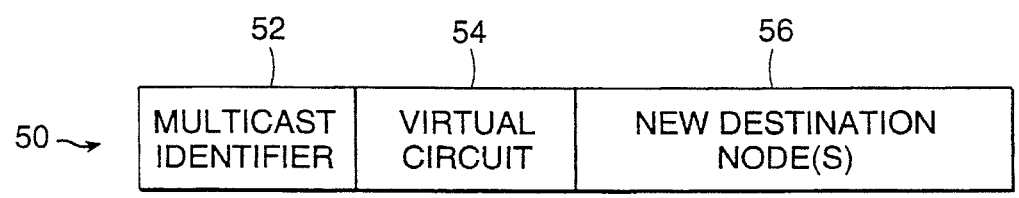
FIG. 5 illustrates the format of a multicast setup packet used to add nodes to open multicast virtual circuits in accordance with the invention.

A multicast setup packet may also be used by a source node to add destination nodes to previously-opened multicast virtual circuits. FIG. 5 illustrates the format of this type of packet 50. For this application, tile multicast identifier (MI) field 52 and virtual circuit (VC) field 54 of the packet 50 contain the same information that is contained in the MI field 42 and VC field 44 of tile packet 40 (FIG. 4); however, tile new destination node(s) field 56 now contains only the new destination node address(es). Upon receiving the "additional" multicast setup packet 50, each switch S of the multicast virtual circuits (FIG. 3) performs a configuration analysis to determine the best route(s) to new destination node(s) and stores the results of the analysis in its forwarding table.

The multicast connection arrangement also provides a means for preventing the creation of an unstable network topology when adding destination nodes to the multicast virtual circuits. Specifically, each switch S of the multicast virtual circuits executes a two-step topology analysis process to detect whether the added node(s) will create loop(s) in the network or will result in the creation of duplicate packets. In accordance with the invention, the first step of the process involves each switch S checking the entries of its forwarding table to determine if the incoming port, through which the multicast setup packet 50 is entering the switch, is allocated to a multicast virtual circuit having an MI value that matches the MI value of the packet 50. If not, the next step involves an inquiry of whether there are any existing entries in the table associated with that particular MI value.

Figure 1A:
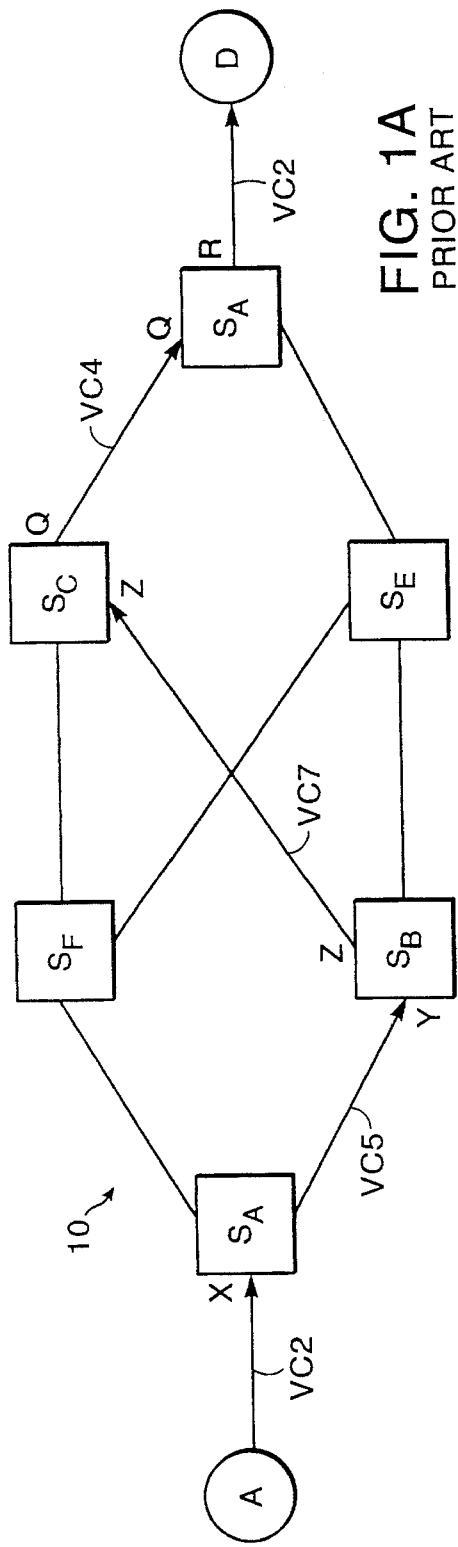
FIG. 1A is a diagram of a conventionally-established, virtual circuit connecting a source node and a destination node of a network.
Figure 1B:
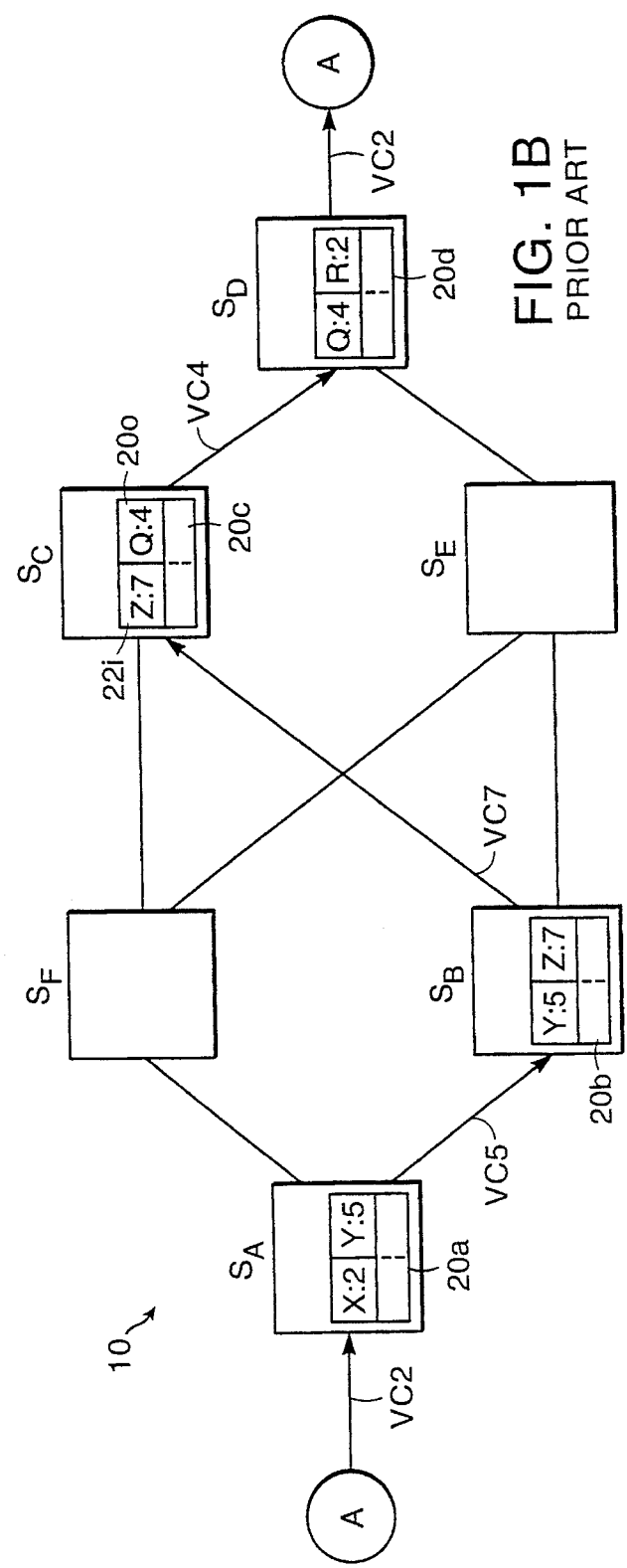
FIG. 1B is a block diagram of conventional forwarding tables and the information contained therein relating to the virtual circuit of FIG. 1A.
Figure 2:
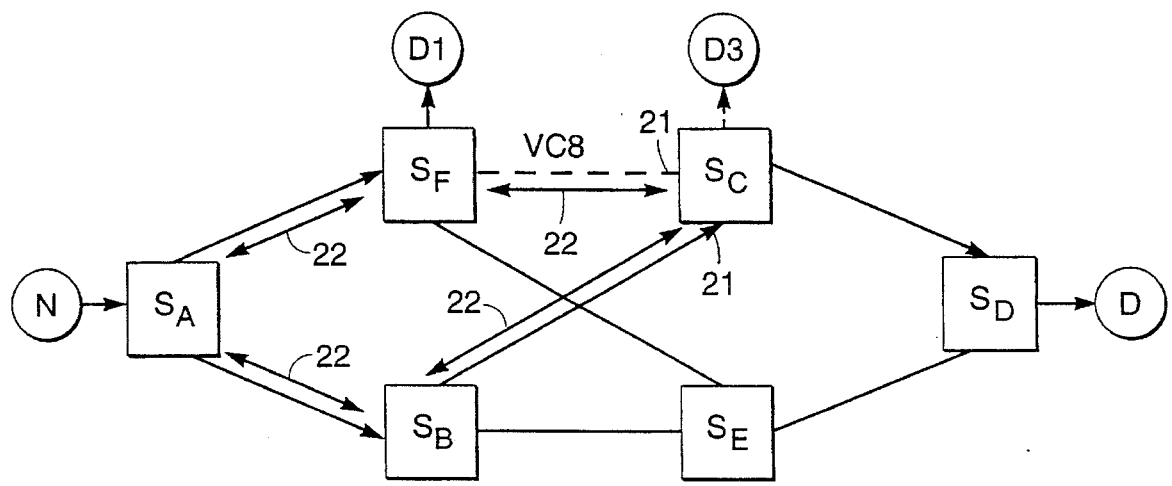
FIG. 2 is a diagram of a conventional delivery tree circuit with branch links for adding nodes to a group of destination nodes.

If tile response to latter inquiry is affirmative, tile switch may maintain a separate virtual circuit for each of the existing and added destination nodes, or it may delete the port marked as being from the source and establish a "new" virtual circuit connection using the added incoming port. Either alternative obviates the formation of a loop (FIG. 2) and is thus contemplated within the teachings of the invention. The switch then updates the entries of its forwarding table to reflect the changed topology.

Figure 6:
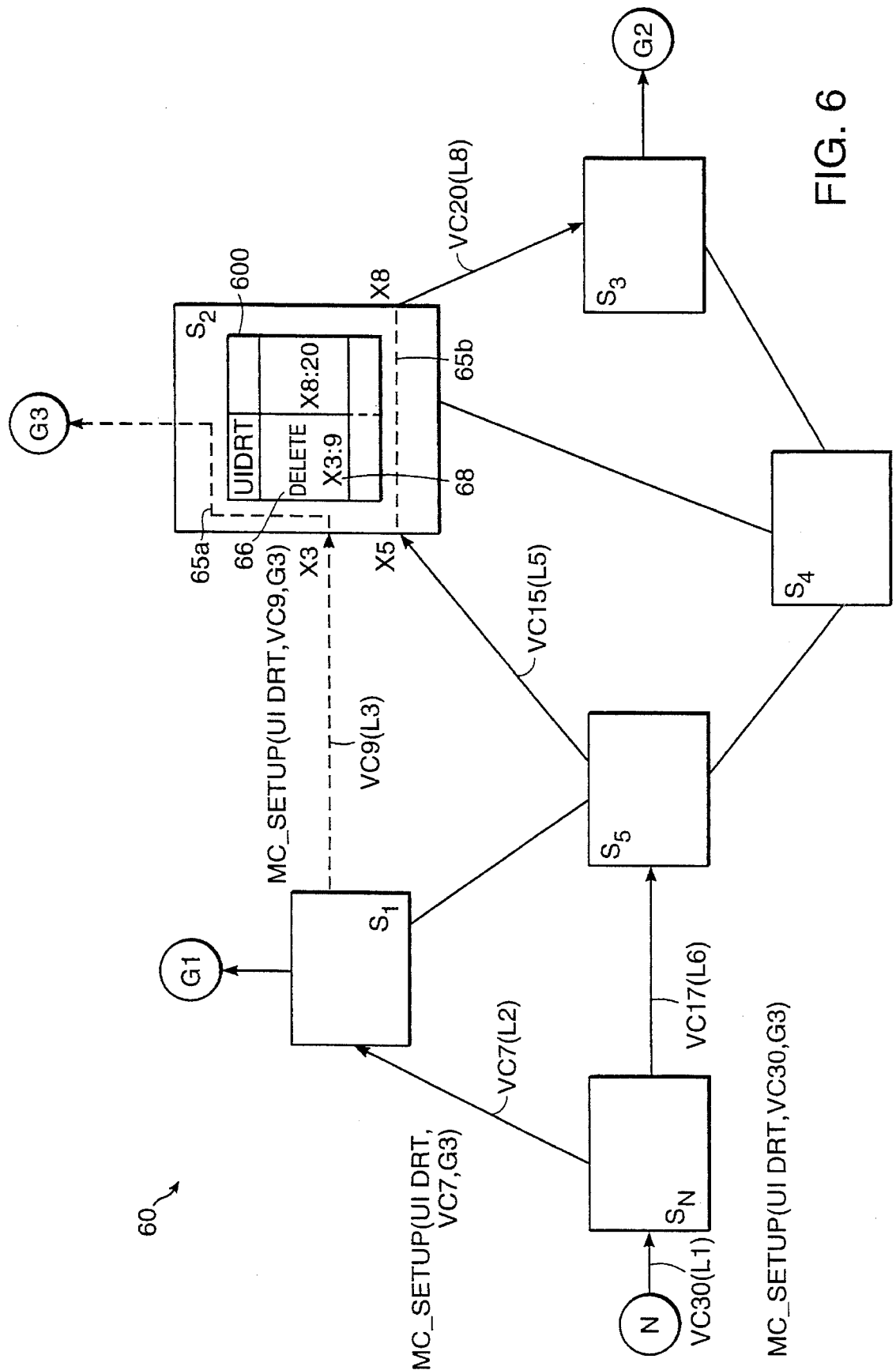
FIG. 6 is a diagram of a connection-oriented, arbitrary-topology network in which the multicast setup packet of FIG. 5 may be advantageously used to add a destination node to the network.

An example of the topology analysis process is provided in connection with FIG. 6, which depicts a connection-oriented, arbitrary-topology network 60 in which the multicast setup packet may be advantageously used to add a destination node to the network. The open multicast virtual circuits between the source node N and destination nodes G1–2 are shown as darken lines. The source node N creates a multicast setup packet 50 to add destination node G3 (see dotted line) and the resulting completed packet 50, MC_SETUP (UIDRT, VC30, G3), is forwarded to the switch $S_N$, where the results of a routing analysis indicates that the packet should be passed on to switch $S_1$. Therefore, switch $S_N$ modifies the contents of the VC field to reflect the multicast virtual circuit VC7 and passes the packet to switch $S_1$. There, the results of another routing analysis indicate that the packet should be forwarded to node G3 via switch $S_2$.

Switch $S_2$ then checks tile entries of its forwarding table 600 to determine if tile incoming port X3, through which tile multicast setup packet 50 is entering tile switch, is allocated to a multicast virtual circuit having an MI value that matches the MI value, e.g., UIDRT, of tile packet 50. An examination of the forwarding table reveals no match. Therefore, the switch $S_2$ determines whether there are ally existing entries in the table associated with tile MI value UIDRT. In this example, there is an existing entry having tile MI value UIDRT, indicating that packet may be looping. The switch $S_2$ thus either maintains a separate virtual circuit for each of tile existing and added destination nodes (separate dotted lines in switch $S_2$ at 65 *a,b*), or it deletes, in its forwarding table, the port marked as being from tile source N (see forwarding table entry X:15"delete" at 66). Further to this latter option, tile switch establishes a new virtual circuit connection comprising the latter incoming port X3 and virtual circuit VC9 (see forwarding table 600 at 68). In either case, tile switch $S_2$ updates tile entries of its forwarding table 600 to reflect the changed circuit topology.

Figure 7:
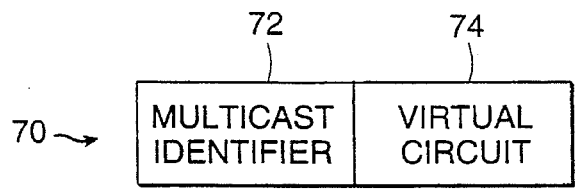
FIG. 7 illustrates the format of a multicast delete packet used to delete nodes from open multicast virtual circuits in accordance with the invention.

In another aspect of the invention a multicast delete packet is used to delete an existing node (and port) from the list of destinations associated with the multicast virtual circuits. FIG. 7 illustrates the format of a multicast delete packet 70 which need only contain a unique MI value in a multicast identifier field 72 and a VC value, pertaining to a port to be deleted, in a virtual circuit field 74. The multicast delete packet is formed by the destination node seeking removal from the virtual circuit and is forwarded to the remaining elements of the multicast virtual circuit.

It should be noted that selection, by the switches, of the "best" virtual circuit routes is based upon topology and traffic conditions existing when the set up procedure or related modification procedures described herein are performed. For example, it is possible that a particular route was chosen as the best route because a certain link was non-operational or congested. Therefore, to ensure that the selected multicast virtual circuit routes are optimized, the set up (and modification) procedure is preferably executed at periodic intervals.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A method for establishing a multicast virtual circuit in an arbitrary-topology network between a source nude and a group of destination nodes, said method comprising the steps of:

creating a multicast setup packet at the source node for transfer to the group destination nodes, said multicast setup packet containing a multicast identifier field for storing a unique multicast identifier value, a virtual circuit field and a destination field identifying the group of destination nodes receiving said multicast setup packet;

allocating selected switches and interconnecting links of said network as elements of said multicast virtual circuits for receiving said multicast setup packet through generating entries of a forwarding table located within an allocated switch, said entries containing routing information pertaining to the outgoing ports associated with the group of destination nodes contained within said destination field of said multicast setup packet to open said multicast virtual circuit.

2. The method of claim 1 wherein said step of allocating comprises the steps of:

forwarding said multicast setup packet to a first allocated switch of said multicast virtual circuits said first allocated switch being associated with the source node and said packet being received at an incoming port of said first allocated switch;

selecting at least one outgoing port of said first allocated switch for transfer of said multicast packet, each of the selected outgoing ports providing a best route to at least one of the group of destination nodes:

generating at least one copy of said multicast packet for each of the selected outgoing ports; and transferring each copy of said multicast packet through each of the selected outgoing ports to one of a subsequent allocated switch and the at least one of the group of destination nodes.

3. The method of claim 2 wherein said step of generating at least one copy of said multicast packet further comprises the steps of:

updating said virtual circuit field of each copy of said multicast setup packet to contain a virtual circuit value associated with each selected outgoing port; and updating said destination field of each copy of said multicast setup packet to contain only those destination nodes receiving the copy of said packet.

4. The method of claim 2 wherein said step of selecting comprises the steps of:

determining if the incoming port is allocated to an open multicast virtual circuit having a multicast identifier value that matches said unique multicast identifier value stored in said multicast setup packet.

5. The method of claim 4 wherein said step of selecting further comprises the steps of, if the incoming port is not allocated to an open multicast virtual circuit having a matching unique multicast identifier value:

determining if there are any existing entries in said forwarding table associated with said unique multicast identifier.

6. The method of claim 2 wherein said step of selecting further comprises the steps of, if there are existing entries in said forwarding table associated with said unique multicast identifier:

deleting said port marked as being from the source node and establishing a multicast virtual circuit with the added incoming port.

7. The method of claim 1 wherein said step of generating entries further comprises the step of marking said multicast identifier value as originating from the source node.

8. An arrangement for establishing multicast virtual circuits in an arbitrary-topology network between a source node and a group of destination nodes, said arrangement comprising:

means for creating a multicast setup packet for transfer to the group destination nodes, said multicast setup packet containing a multicast identifier field, a virtual circuit field and a destination field identifying the group of destination nodes receiving said multicast setup packet; and, means for allocating selected switches and interconnecting links of said network as elements of said multicast virtual circuits for receiving said multicast setup packet through generating entries of a forwarding table located within an allocated switch said entries containing routing information pertaining to outgoing ports associated with the group of destination nodes contained within said destination field of said multicast setup packet to open said multicast virtual circuit.

* * * * *